United States Patent [19]

Greenwood et al.

[11] Patent Number: 4,479,394

[45] Date of Patent: Oct. 30, 1984

[54] ELECTRIC STARTER WITH CONFINED CUSHION

[75] Inventors: Leon D. Greenwood, Okemos; Clifford L. Dye, Eaton Rapids, both of Mich.

[73] Assignee: Eaton Stamping Company, Eaton Rapids, Mich.

[21] Appl. No.: 274,815

[22] Filed: Jun. 18, 1981

[51] Int. Cl.$^3$ .................... F02N 15/06; F16D 11/06; F16D 23/00; F16D 13/22

[52] U.S. Cl. .................... 74/7 R; 74/6; 192/52; 192/55; 192/65

[58] Field of Search .................... 74/7 R, 6; 192/52, 55, 192/65

[56] References Cited

U.S. PATENT DOCUMENTS

| | | | |
|---|---|---|---|
| 1,317,811 | 10/1919 | Nielsen | 192/55 |
| 1,453,202 | 4/1923 | Stevens | 192/52 |
| 2,221,083 | 11/1940 | Fitzgerald | 74/7 |
| 2,224,525 | 12/1940 | Sekella | 74/7 |
| 2,235,121 | 3/1941 | Sekella | 74/7 |
| 3,205,989 | 9/1965 | Mantey | 192/55 |
| 4,330,713 | 5/1982 | Greenwood | 74/7 R |
| 4,347,442 | 8/1982 | White et al. | 290/38 R |

*Primary Examiner*—Leslie A. Braun
*Assistant Examiner*—Michael J. Gonet
*Attorney, Agent, or Firm*—Beaman & Beaman

[57] ABSTRACT

An electric starter apparatus for small internal combustion engines wherein engagement of a starter pinion gear with engine flywheel gear teeth is produced by the axial translation of a nut member mating with helices formed on the motor shaft. An elastomer drive and cushion member is interposed between the nut and pinion gear wherein axial displacement of the pinion gear is through the elastomer, as is the transmission of torque to the gear. The elastomer includes an annular axially extending projection received within an annular recess defined in the pinion gear whereby the recess partially confines the elastomer during torque transmission and engine cranking, and concentrically locates the elastomer relative to the motor shaft.

3 Claims, 3 Drawing Figures

ELECTRIC STARTER WITH CONFINED CUSHION

BACKGROUND OF THE INVENTION

Electric starters for internal combustion engines often employ a pinion gear which is axially displaced upon the motor drive shaft for selective engagement with gear teeth defined on the engine flywheel. While various devices and mechanical elements have been used to displace the pinion gear upon the motor armature shaft it is commonly known to use helices formed upon the shaft which engage with a nut threaded thereon to axially translate the pinion into engagement with the flywheel teeth. With electric starters for small internal combustion engines such as found on snow blowers, lawn mowers, garden tractors, and the like, rapidly rotating electric motors are used wherein the initial resistance to rotation of the nut member and associated structure upon energization of the motor is used to axially displace the nut member and pinion for engagement between the pinion gear and flywheel. Such operation results in rapid axial displacement of the pinion gear, and unless the gear and flywheel teeth are properly aligned the pinion gear will engage the side of the flywheel gear until alignment occurs, resulting in flywheel or pinion gear tooth peening which, over a period of time, may cause a gear tooth to deform, fracture, or bind with the mating teeth.

In order to cushion the initial engagement between the pinion and flywheel gear teeth combination an elastomeric cushioning and torque transmitting member may be interposed between the nut and pinion gear to cushion and absorb the impact between the pinion gear and misaligned flywheel tooth, and the cushioning member may also be used to transmit the cranking torque from the armature shaft through the nut and to the pinion gear. Thus, the elastomer cushion will absorb torque vibrations during cranking, as well as cushion the initial engagement, and aid in the alignment of the pinion gear and flywheel gear teeth.

Small internal combustion engines often employ aluminum flywheels utilizing gear teeth formed of the same material, and as the starter pinion gear may be formed of steel the flywheel gear teeth may be damaged from repeated impact by the pinion gear if the pinion and flywheel gear teeth are not properly aligned as the pinion gear enters the flywheel teeth. To minimize damage between the flywheel and pinion gear teeth the assignee has developed cushioning members capable of producing an initial "soft" cushioning of the pinion gear upon initial engagement with the flywheel teeth, and as the torque requirements increase a stiffer or firmer cushioning is achieved which is capable of transmitting the desired torque. Electric starters produced by the assignee have utilized various elastomeric cushioning members, and examples can be found in U.S. Pat. Nos. 3,791,685; 4,330,713 and 4,347,442.

The elastomer cushioning member of the aforedescribed type is usually of an annular configuration and circumscribes the helices formed on the motor armature shaft. As the elastomer material is highly compressed during cranking and will deform radially one common problem arises from the tendency for the elastomeric material to extrude into the shaft helices wherein elastomer particles become trapped within the helices and cause the nut to bind with respect to its movement on the shaft.

It is an object of the invention to provide an electric starter for internal combustion engines utilizing an elastomeric cushioning and torque transmitting member wherein a pinion gear is employed having a recess receiving an annular ring defined upon the elastomeric member wherein the pinion gear recess partially confines the elastomeric material during cushioning and torque transmission.

An additional object of the invention is to provide a nut, pinion gear and elastomeric cushion assembly for an internal combustion engine electric starter wherein all three components are mounted upon a starter shaft, and the pinion gear and elastomeric cushion are provided with interrelating concentric configurations which cooperate during engine cranking to concentrically maintain the cushion upon the starter shaft.

An additional object of the invention is to produce an electric starter assembly for internal combustion engines utilizing helices defined upon the starter motor shaft wherein the helices are of a greater helical angle than is the common practice in order to produce engagement between a pinion gear and the engine flywheel before the starter shaft reaches its maximum rate of rotation, and thereby reducing the degree of impact between the starter pinion gear and flywheel gear teeth in the event of tooth misalignment.

In the practice of the invention the electric starter motor includes an armature shaft which extends from the motor housing having a free end upon which an abutment is defined. A helical thread of heavy duty type, such as of square configuration, is defined upon the armature shaft, and in the disclosed embodiment is adjacent the free end. The helices preferably have an unusually high angle, preferably approximately 33°, as compared with the usual helical angle of approximately 23° with this type of starter.

A pinion gear is rotatably mounted upon the armature shaft having a smooth bore for axial as well as rotational movement thereto, and the pinion gear includes a radial friction surface having an axially extending annular groove or recess intersecting the friction surface and forming a part thereof. The gear groove is concentric to the shaft axis and is defined by inner and outer conical surfaces converging toward a base.

A nut member, in the form of a flat plate or washer, is mounted upon the shaft helices, and includes a threaded bore to produce a mating and threaded relationship with the helices and a radial friction surface is defined on the nut. Thus, relative rotation between the nut and shaft will produce an axial displacement of the nut upon the shaft.

An elastomeric cushion and torque transmitting member of annular configuration is interposed between the friction surface of the pinion gear and the flat friction surface of the nut. The elastomeric member includes a radial surface engaging the nut friction surface and complimentary in configuration thereto. The elastomeric member also includes an axially extending ring projection which is concentric to the armature shaft and extends toward the pinion gear. The ring projection is formed by conical inner and outer surfaces which converge toward a nose which is in radial alignment with the pinion gear groove and received therein. The included angle defined by the pinion gear groove surfaces is greater than the included angle defined by the elastomeric ring surfaces whereby a clearance exists within the gear groove between the groove and elastomeric ring material until deformation of the ring material occurs. As the amount of elastomeric ring material at the ring nose is relatively small, and as the ring material may radially deform into engagement with the gear groove during initial stages of pinion gear displacement and cranking, an initial "soft" cushioning of the pinion gear is provided, and as the axial forces imposed upon the elastic member by the nut increase a greater amount of elastomeric material is placed under compression, "stiffening" the cushioning characteristics of the elastomer and permitting the necessary torque forces to be transmitted between the nut and pinion gear.

As the pinion gear groove is concentrically oriented to the armature shaft the reception of the elastomer ring into the groove will aid in centering the elastomer relative to the shaft and maintaining it concentric thereto while the elastomer is under compression and deformed. This support of the elastomer aids in keeping the elastomer from entering the helix, and minimizes the likelihood that elastomeric particles will enter the helix and interfere with the nut movement thereon.

A compression spring circumscribing the armature shaft biases the pinion gear in an axial direction toward the nut member and elastomeric cushion, and a stop cup mounted upon the shaft functions to position the pinion relative to the flywheel during cranking.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
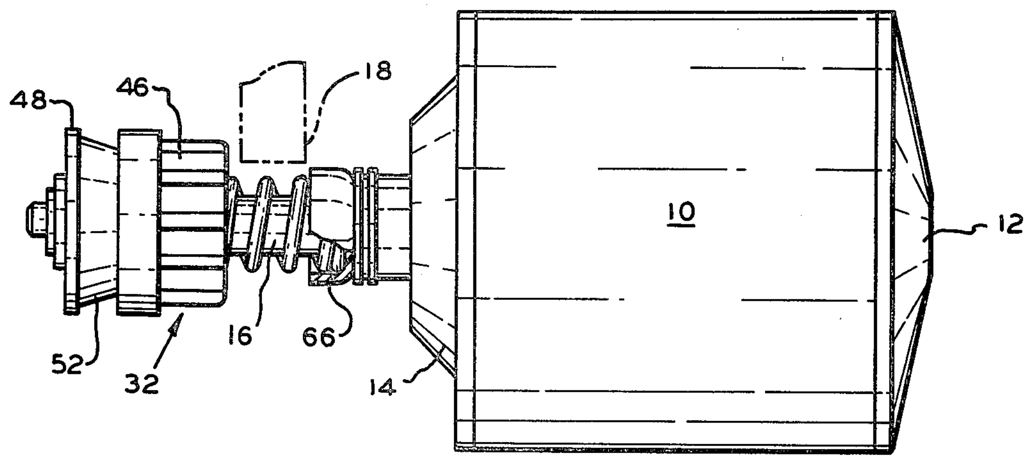
FIG. 1 is an elevational view of an electric starter for internal combustion engines in accord with the invention, the starter components being shown in the normal, noncranking position.

With reference to FIG. 1, the electric starter motor is represented at 10 and comprises a sheet metal housing having an end cap 12, and an end cap 14 from which the armature shaft 16 extends. Simple bearings, not shown, are mounted in the end caps, and the housing or end caps may include various brackets or other supporting structure, not shown, for mounting the starter motor in the desired relationship to the engine flywheel as represented in phantom lines at 18. The flywheel 18 includes gear teeth 20 defined at its outer periphery, and it will be appreciated that the type of starter illustrated is normally used in relatively light duty applications for starting snow blowers, lawn mowers, lawn tractors, and the like. The starter motor 10 may be powered by a twelve volt battery, and in some applications will be of a 110 volt AC type wherein a utility power supply, not shown, is utilized to energize the motor.

Figure 2:
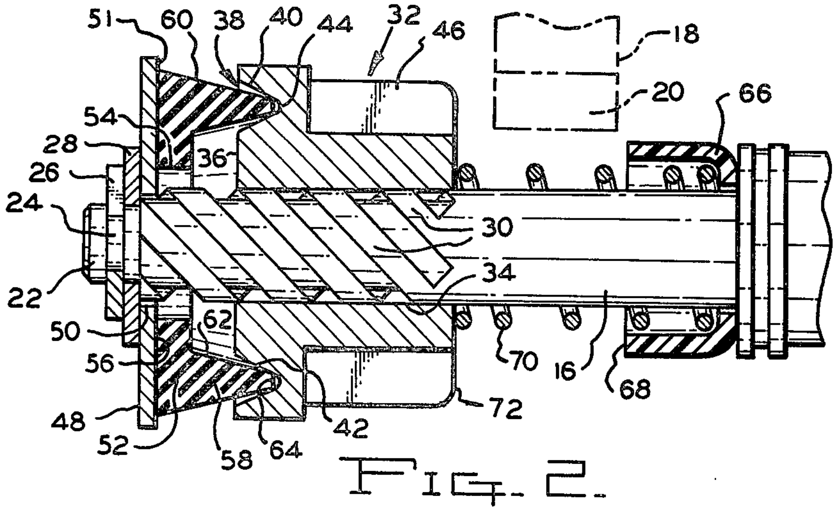
FIG. 2 is an enlarged, detail, elevational, sectional view of the starter components illustrating the pinion gear in the noncranking position.
Figure 3:
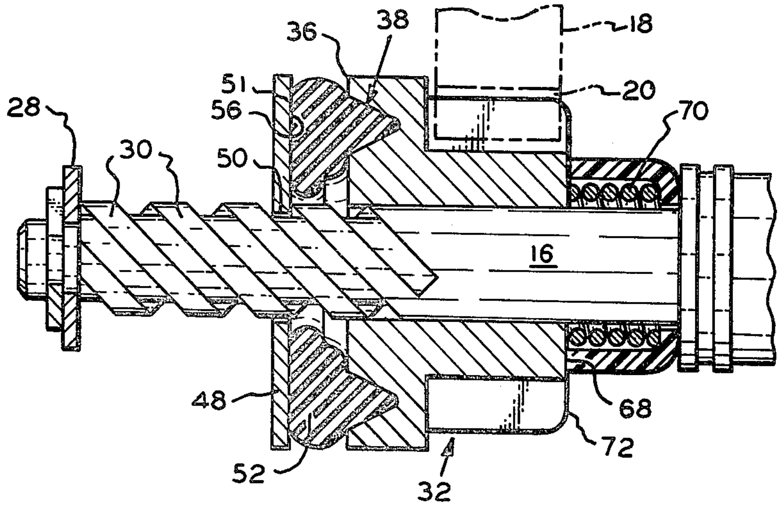
FIG. 3 is an elevational, sectional view similar to FIG. 2 illustrating the starter components in an engine cranking relationship.

As will be appreciated from FIGS. 2 and 3, the armature shaft 16 includes a free end 22 in which a groove 24 is defined for receiving the snap ring 26. A washer 28 abuts against the snap ring 26 and constitutes a stop for maintaining the starter structure upon the shaft.

The shaft 16 is provided with a helix 30 thread for substantially one half its length adjacent the free end 22. The remainder of the shaft is of a smooth cylindrical form. The helix 30 may be of a high strength square configuration, and the helical angle is greater than usually used with this type of starter, and is preferably approximately 33°, as compared with the usual 23° helix angle with this general type of electric starter. The outer surface of the helices 30 is cylindrical and is a continuation of the diameter of the threaded shaft portion.

A pinion gear 32 is rotatably mounted upon the shaft 16 and includes a smooth bore 34 of slightly greater diameter than the diameter of the shaft. Thus, the pinion gear is capable of both rotation and axial displacement upon the shaft 16. The pinion 32 includes a radially extending surface 36 which constitutes a friction surface, as does the annular gear groove 38 which intersects the surface 36. The gear groove 38 is defined by a conical outer surface 40, and an inner conical surface 42, and these surfaces converge to the right, FIG. 2, toward a base concave surface 44, and define an included angle therebetween. The gear 32 also includes gear teeth 46 defined thereon which are complimentary to the flywheel gear teeth 20.

A nut 48 in the form of an annular plate or washer is provided with a threaded bore 50 which mates with the helices 30 as to be threaded thereon, and the nut includes a flat radial inner friction surface 51 disposed toward the pinion gear 32. Thus, relative rotation between the shaft 16 and nut 48 will cause an axial displacement of the nut toward the right, and movement of the nut toward the left is limited by engagement with the abutment washer 28.

The elastomeric cushion and torque transmission member is indicated at 52, and comprises an annular member having a bore 54 which is of a greater diameter than that of the shaft 16. The elastomeric member 52 includes a flat radial friction surface 56 which normally engages the nut friction surface 51, and an axially projecting annular ring 58 is defined upon the member 52 by an outer conical surface 60 and an inner conical surface 62 which converge in the direction to the right, FIG. 2 at a nose 64. The member 52 may be formed of rubber, neoprene or other similar material which will absorb vibration, deform under compression, and be capable of withstanding the frictional and abrasive service to which it is subjected. As will be appreciated from FIG. 2, the radial dimension of the ring 58 adjacent the nose surface 64 is at a minimum, and due to the conical configuration of the surfaces 60 and 62 the amount of elastomeric material within the ring increases toward the nut 48.

An abutment cup 66, preferably formed of nylon, is supported on the shaft 16 adjacent the end cap 14, and the cup includes an abutment surface 68 adapted to engage the inner end of the pinion gear during the cranking operation.

A compression spring 70 interposed between the cup 66 and the pinion gear inner end produces a normal axial biasing force on the pinion gear toward the shaft free end 22, and the cup 66 permits the spring to be fully compressed during cranking, as will be appreciated from FIG. 3.

The normal relationships of the starter components are as shown in FIGS. 1 and 2 wherein the pinion gear 32 will be displaced to the left under the influence of the spring 70, and the elastomer member 52 will be under very little compression, and will not be deformed from its usual configuration. The pinion gear 32 will clear the flywheel gear teeth 20, and the relationship of FIG. 2 exists prior to initiating the cranking cycle, or while the engine is running.

As soon as the electric motor 10 is energized the shaft 16 will rotate. The inertial resistance to rotation of the nut 48 will cause a relative rotation between the helices 30 and the nut producing an axial displacement of the nut to the right. This nut displacement also displaces the elastomer 52 and the pinion gear 32 to the right against the biasing force of spring 70. During this initial displacement of the nut, elastomer and gear only a small degree of rotation of these components may occur in view of their initial inertial resistance to rotation.

The fact that the helix angle of the helices 30 is higher than usual causes sufficient axial displacement of the pinion gear to move to a point of engagement with the flywheel gear teeth 20 prior to the starter motor reaching its full rate of revolution. Thus, an earlier engagement of the pinion gear and flywheel gear teeth will occur as compared with similar starters using a lesser helix angle thereby reducing the force of impact between the pinion gear tooth edge 72, and the edge of a flywheel gear tooth 20 in the event that these gear teeth are not properly aligned during initial engagement, which is often the case.

If the gear teeth of the gear 32 and flywheel are sufficiently aligned, the pinion gear teeth enter the gear teeth 20 and the pinion gear 32 will engage cup surface 68. Cranking of the flywheel 18 now occurs as the nut 48 has displaced the pinion gear 32 fully to the right against the cup 66, FIG. 3, and maximum compression is imposed upon the elastomer 52. As the elastomer is compressed, initially, the elastomer material adjacent the nose surface 64 will deform and fill the clearance within the groove 38. This initial deformation of the ring adjacent the nose is due to the fact that lesser elastomer material exists adjacent the nose surface due to the converging configuration of the ring producing an initial "soft" axial cushioning between the elastomer and the gear. As the torque transmitted between the nut and gear, and elastomer compression, increases, the elastomer ring material completely fills the groove 38, and the elastomer ring material will deform against the gear surface 36, and simultaneously deform radially inwardly and outwardly, as will be apparent from FIG. 3.

The diameter of the elastomer bore 54 is of such dimension that under maximum deformation the elastomer will not extrude into the helices 30 and possibly interfere with the mating between the helices and the nut 48. The annular concentricity of the gear groove 38 and ring 58 will maintain concentricity between the pinion gear 32 and elastomer member 52 even during maximum elastomer deformation, and the presence of the gear groove eliminates the fouling of the helices with elastomer particles as may occur with starters using prior elastomer cushioning and torque transmitting members.

Rotation of the shaft 16 continues until the engine starts, and upon such occurrence the flywheel will now drive the pinion gear 32 and rotate the gear, elastomer and nut in a direction which will move these components to the left against the stop washer 28, and clear the flywheel for normal engine operation. The starter motor 10 is deenergized, and the components will assume the relationship of FIGS. 1 and 2.

Often, the pinion gear teeth 46 will be misaligned with respect to the flywheel gear teeth 20 during initiation of a cranking cycle, and the forward edge 72 of a pinion gear tooth will engage the opposed flywheel gear tooth edge. This interference will immediately terminate axial displacement of the pinion gear on the shaft 16 and cause the nut 48 to impart a torque upon the gear through the elastomer 52, which will rotate the pinion gear to align the pinion gear teeth with the flywheel gear teeth and permit full meshing as represented in FIG. 3. Of course, such impact between the pinion and flywheel gear teeth adversely affects both gears, and particularly the flywheel gear teeth which may be formed of aluminum or a softer material than the pinion gear, and it is desirous to minimize this type of impact as much as possible. In this respect, the initial "soft" cushioning provided by the reduced amount of elastomer material adjacent the ring nose surface 64 is significant as is the greater helix angle. The greater helix angle reduces the velocity of the pinion gear as it approaches the flywheel gear, minimizing the effect of gear edge impact, and as the nose of the elastomer permits expanding of the nose material into the groove 38 clearances the elastomer ring nose is capable of absorbing much of the aforedescribed impact and shock. As the axial forces on the elastomer 52 increase, as well as the torque transmitting requirements, an increase in the "stiffness" of the elastomer to axial deformation occurs due to the ring configuration, and the elastomer is capable of transmitting the cranking torque requirements over many starting cycles.

The confining of the elastomeric member 52 within the annular gear groove 38 produces several advantages. For instance, radially outward extrusion of the elastomeric material is controlled during compression of the elastomer, and this control minimizes any loss of soft initial cushioning which might otherwise occur because of outward extrusion. Further, the presence of the gear groove converging surfaces 40 and 42 provides an additional frictional relationship with the elastomer than would not be present if the groove 38 did not exist. A wedging action occurs between the groove 38 and the elastomer member 52 which increases the friction between the elastomer and gear to prevent slippage therebetween, even when the pinion gear is formed of a low-friction material such as a synthetic plastic. As such high friction discourages slippage and wear adjacent the nose 64 the likelihood of wear occurring in the elastomer adjacent the nose is reduced and the configuration of the nose is maintained for producing the initial soft engagement desired.

The concentric support of the elastomeric member 52 achieved by the gear groove 38 also controls the compression of the elastomeric member 52 keeping the relatively unstable and soft nose 64 in a fixed radial location, as well as preventing outward extrusion and mislocation of the elastomer.

It is appreciated that various modifications to the inventive concepts may be apparent to those skilled in the art without departing from the spirit and scope of the invention. For instance, the annular groove for receiving the nose of the elastomeric member could be located within the nut component rather than in the pinion gear, or both the nut member and pinion gear could be provided with annular concentric grooves for receiving annular noses defined on each end of an elastomeric member, and in the described embodiment only one arrangement of the components practicing the inventive concepts is illustrated.

We claim:

1. In an electric starter for internal combustion engines including an electric motor having an armature shaft having a helical thread defined thereon, a pinion gear rotatably mounted upon the shaft for axial movement thereto and having a friction surface defined thereon, a nut mounted upon the shaft threaded upon the thread and having a friction surface disposed toward the pinion gear, a compression spring circumscribing the shaft axially biasing the pinion gear toward the nut, and an annular elastomer member circumscribing the shaft and located between the nut and pinion gear having a first friction surface engagable by the nut friction surface and a second surface engagable with the pinion gear friction surface, the improvement comprising, the pinion gear friction surface including a radial surface having an annular axially extending groove concentric to the shaft intersecting said radial surface, said groove including inner and outer axially extending walls and a base, said pinion gear groove inner and outer walls being of a conical configuration converging toward said groove base defining a first included angle, the elastomer member second friction surface including an annular ring concentric to the armature shaft and in radial alignment with said groove defined by axially extending inner and outer surfaces and a nose surface, said ring inner and outer sufaces being conical in configuration converging in the direction of said nose surface defining a second included angle, said nose surface being received within said groove during engine cranking, said second included angle defined by said ring surfaces being less than said first included angle defined by said pinion gear friction surface whereby clearance exists within said pinion gear groove to accommodate expansion of said elastomer member ring during the initial compression of said elastomer member ring, said elastomer member ring being of reduced radial dimension adjacent said nose surface to produce an initial soft cushioning of engagement between the pinion gear and elastomer member, said groove confining said ring nose surface during torque transmission from the elastomer member to the pinion gear.

2. In an electric starter as in claim 1 wherein the helix angle of the thread defined on the armature shaft is between 30 and 35 degress.

3. In an electric starter for internal combustion engines having a flywheel including gear teeth selectively engaged by the starter wherein the starter includes an electric motor having an armature shaft having a helical thread defined thereon, a pinion gear member rotatably mounted upon the shaft axially displaceable thereto, and having a friction surface defined thereon, a nut member mounted upon the shaft threaded upon the helical thread having a friction surface disposed toward the pinion gear member, a compression spring circumscribing the shaft axially biasing the gear member toward the nut member and an annular elastomer element circumscribing the shaft located between the nut and pinion gear member having a first friction surface engagable by the nut member friction surface and a second friction surface engagable with the gear member friction surface, the improvement comprising, at least one of the member friction surfaces including an annular extending groove concentric to the armature shaft, said groove including inner and outer axially extending walls and a base, at least one of the elastomer element friction surfaces including an annular projecting ring concentric to the armature shaft defined by axially extending inner and outer surfaces and a nose surface, said nose surface being recieved within said groove during engagement of the elastomer element with the pinion gear member during engine cranking whereby said groove at least partially confines the elastomer element ring during compression thereof during cranking and maintains the elastomer element and armature shaft concentrically, said annular projecting ring inner and outer surfaces being conical in configuration converging in the direction of said nose surface defining a first included angle and resulting in a reduced elastomer mass adjacent said nose surface and an increasing elastomer mass in the axial direction away from said nose surface whereby initial engagement of said nose surface and groove provides a soft cushioning between the pinion gear member and elastomer element with an increase in cushioning stiffness as the material of the projecting ring is deformed during flywheel engagement and engine cranking, said member friction surface groove inner and outer walls being of a conical configuration converging toward said groove base defining a second included angle, said first included angle defined by said ring surfaces being less than said second included angle defined by said groove walls to accommodate expansion of said elastomer element ring during the initial compression of said elastomer element ring.

* * * * *